United States Patent
Moore et al.

(10) Patent No.: US 10,108,438 B2
(45) Date of Patent: Oct. 23, 2018

(54) MACHINE READABLE INSTRUCTIONS BACKWARD COMPATIBILITY

(71) Applicant: Hewlett-Packard Development Company, L.P., Houston, TX (US)

(72) Inventors: Joshua M. Moore, Lexington, KY (US); Matthew J. Riley, Lexington, KY (US); Eric Todd Debusschere, Lexington, KY (US); Thomas P. Gundrum, Lexington, KY (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/543,537

(22) PCT Filed: Jan. 28, 2015

(86) PCT No.: PCT/US2015/013314
§ 371 (c)(1),
(2) Date: Jul. 13, 2017

(87) PCT Pub. No.: WO2016/122492
PCT Pub. Date: Aug. 4, 2016

(65) Prior Publication Data
US 2018/0004551 A1    Jan. 4, 2018

(51) Int. Cl.
*G06F 9/44* (2018.01)
*G06F 9/445* (2018.01)
*G06F 8/65* (2018.01)

(52) U.S. Cl.
CPC ........... *G06F 9/44536* (2013.01); *G06F 8/65* (2013.01)

(58) Field of Classification Search
CPC . G06F 8/65; G06F 8/68; G06F 11/362; G06F 9/44536
See application file for complete search history.

(56) References Cited

U.S. PATENT DOCUMENTS

| 7,257,805 | B2* | 8/2007 | Gritter | G06F 11/362 714/34 |
| 7,664,984 | B2* | 2/2010 | Wang | G06F 11/1417 714/15 |
| 7,779,401 | B2* | 8/2010 | Scian | G06F 8/658 717/168 |
| 8,145,940 | B1* | 3/2012 | Wang | G06F 11/1417 714/6.1 |
| 8,255,363 | B2* | 8/2012 | Johnson | G06F 8/71 707/624 |

(Continued)

OTHER PUBLICATIONS

Chilana, P.K. et al., "Understanding Expressions of Unwanted Behaviors in Open Bug Reporting," (Research Paper), Published in: Visual Languages and Human-Centric Computing (VL/HCC), 2010 IEEE Symposium on, Sep. 21-25, 2010, pp. 203-206.

*Primary Examiner* — Marina Lee
(74) *Attorney, Agent, or Firm* — Mannava & Kang

(57) ABSTRACT

According to an example, machine readable instructions backward compatibility may include determining changes between first and second sets of machine readable instructions, and generating a backward compatibility switch. The backward compatibility switch may be implemented in the second set of machine readable instructions to selectively revert functionality to functionality of the first set of machine readable instructions.

15 Claims, 8 Drawing Sheets

(56) References Cited

U.S. PATENT DOCUMENTS

| | | | |
|---|---|---|---|
| 8,365,160 B2* | 1/2013 | Scian | G06F 8/658 |
| | | | 717/168 |
| 8,423,993 B2* | 4/2013 | Faus | G06F 8/65 |
| | | | 717/169 |
| 8,595,715 B2* | 11/2013 | Ward | G06F 8/71 |
| | | | 717/168 |
| 8,635,608 B2 | 1/2014 | Ramesh et al. | |
| 8,762,980 B1* | 6/2014 | Sobel | G06F 8/65 |
| | | | 717/170 |
| 8,943,492 B2* | 1/2015 | Scian | G06F 8/658 |
| | | | 717/171 |
| 9,229,707 B2* | 1/2016 | Borissov | G06F 8/67 |
| 9,720,719 B2* | 8/2017 | Graham | G06F 9/45558 |
| 2002/0087828 A1* | 7/2002 | Arimilli | G06F 15/8007 |
| | | | 712/32 |
| 2003/0139151 A1 | 7/2003 | Lifshitz et al. | |
| 2007/0088898 A1 | 4/2007 | Gabryjelski | |
| 2007/0300205 A1* | 12/2007 | Scian | G06F 8/658 |
| | | | 717/106 |
| 2009/0222811 A1* | 9/2009 | Faus | G06F 8/65 |
| | | | 717/173 |
| 2010/0162226 A1* | 6/2010 | Borissov | G06F 8/67 |
| | | | 717/173 |
| 2010/0306756 A1* | 12/2010 | Scian | G06F 8/658 |
| | | | 717/168 |
| 2011/0083122 A1* | 4/2011 | Chen | G06F 11/3664 |
| | | | 717/124 |
| 2011/0113424 A1* | 5/2011 | Ewington | G06F 8/658 |
| | | | 717/178 |
| 2011/0138374 A1* | 6/2011 | Pal | G06F 8/656 |
| | | | 717/169 |
| 2011/0219272 A1 | 9/2011 | Lai et al. | |
| 2013/0042226 A1 | 2/2013 | Glick et al. | |
| 2013/0104121 A1* | 4/2013 | Iwaya | G06F 8/61 |
| | | | 717/174 |
| 2014/0237464 A1* | 8/2014 | Waterman | G06F 8/65 |
| | | | 717/172 |
| 2014/0282487 A1 | 9/2014 | O'Neill et al. | |
| 2014/0325498 A1* | 10/2014 | Sirois | G06F 8/65 |
| | | | 717/170 |
| 2015/0178105 A1* | 6/2015 | Graham | G06F 8/68 |
| | | | 718/1 |
| 2017/0034023 A1* | 2/2017 | Nickolov | H04L 43/0817 |

\* cited by examiner

```
public void CalculatePageFlow(Page page)
{
    if(page.addContent().size > page.paperSize) //v1.0 code
    {
        page.FlowToNextPage();
    }
}
```

300

```
public void CalculatePageFlow(Page page)
{
    if(USE_OLD_FLOW_METHOD)
    {
        pageSize = page.paperSize //Added in v3.0
    }
    else
    {
        pageSize = page.numPixels/page.Resolution //Fixed in v2.0
    }
    if(page.addContent().size > pageSize)
    {
        page.FlowToNextPage();
    }
}
```

| Customer | Current Version | New Version | Flow method in current version | Flow method needed in new version |
|---|---|---|---|---|
| Customer-A | 2.0 | 4.0 | New method | New method (switch n/a) |
| Customer-B | 1.0 | 2.0 | Old method | New method (forced) |
| Customer-C | 1.0 | 4.0 | Old method | New method (w/o switch) |
| Customer-D | 1.0 | 4.0 | Old method | Old method (with switch) |

FIG. 4

MACHINE READABLE INSTRUCTIONS BACKWARD COMPATIBILITY

CROSS-REFERENCE TO RELATED APPLICATION

This application is a U.S. National Stage Application of and claims priority to International Patent Application No. PCT/US2015/013314, filed on Jan. 28, 2015, and entitled "MACHINE READABLE INSTRUCTIONS BACKWARD COMPATIBILITY."

BACKGROUND

A machine readable instructions patch includes a sub-set of machine readable instructions designed to update a set of machine readable instructions or supporting data for the set of machine readable instructions, for example, for fixing or improving the set of machine readable instructions. If a new version of the set of machine readable instructions is available, the set of machine readable instructions may be updated to the new version, or alternatively, a user may install a machine readable instructions patch, if available, for an older version of the set of machine readable instructions to fix or improve the older version of the set of machine readable instructions.

BRIEF DESCRIPTION OF DRAWINGS

Features of the present disclosure are illustrated by way of example and not limited in the following figure(s), in which like numerals indicate like elements, in which:

FIG. 3 illustrates an initial set of machine readable instructions, and an updated set of the machine readable instructions including a backward compatibility switch, according to an example of the present disclosure;

FIG. 4 illustrates various versions of machine readable instructions including implementation of a backward compatibility switch, according to an example of the present disclosure;

DETAILED DESCRIPTION

Figure 1:
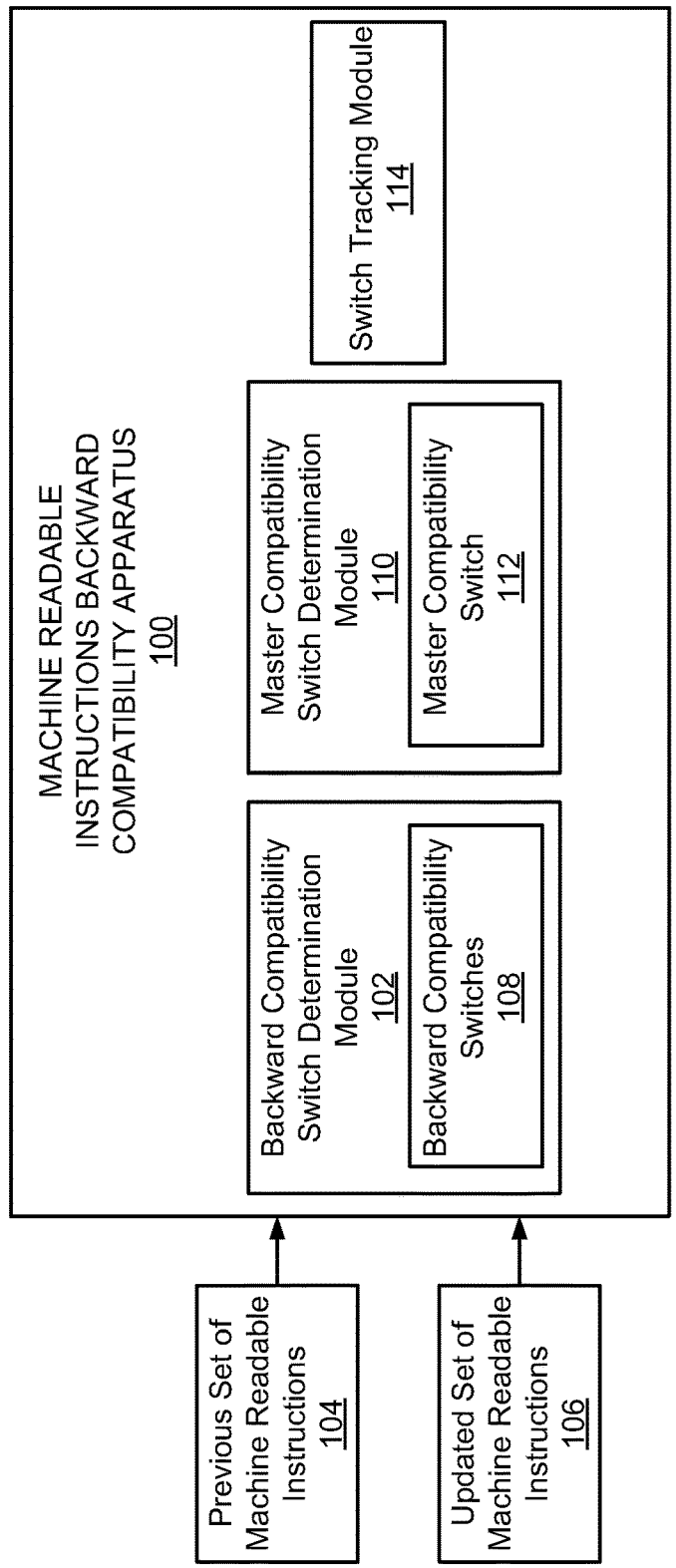
FIG. 1 illustrates an architecture of a machine readable instructions backward compatibility apparatus, according to an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

When upgrading a set of machine readable instructions, a user may install an entirely new release (e.g., a new version) of the set of machine readable instructions, or apply a machine readable instructions patch to correct a specific defect. Installing a new release of the set of machine readable instructions may mean that the user is accepting extensive changes to the set of machine readable instructions. In this regard, while changelogs or release notes may identify the changes to the set of machine readable instructions, analysis of such changelogs or release notes may be challenging.

With respect to machine readable instructions patches, while such patches may be effective at allowing a user to selectively update various types of functionality of a set of machine readable instructions, installation of patches may nevertheless add complexity to a support model with respect to the set of machine readable instructions as the number of permutations of applied patches may be practically limitless. In this regard, replication of a user's environment may be challenging, for example, due to the extensive permutations of the machine readable instructions.

In certain cases, a user may prefer the operation of a set of machine readable instructions in a previous form (e.g., a previous version of the set of machine readable instructions). For example, the previous version of the set of machine readable instructions may include different preferences and/or custom implementations that rely on existing defects (e.g., work-arounds). A user may also prefer a previous version of the set of machine readable instructions based on personal preferences or a difference of opinion.

In order to address the aforementioned aspects related to machine readable instructions, according to examples, a machine readable instructions backward compatibility apparatus and a method for machine readable instructions backward compatibility are disclosed herein. The apparatus and method disclosed herein may generally provide for identification of a relatively small subset of changes to an updated (e.g., latest) version of a set of machine readable instructions to facilitate identification of causes of any differences. That is, the apparatus and method disclosed herein may provide for the identification and marking of changes to a set of machine readable instructions, where the changes may cause a specified (e.g., noticeable) difference in the output of the set of machine readable instructions. The identified changes may be individually turned on or off by using backward compatibility switches (i.e., command line arguments) to turn on or off the identified changes. The apparatus and method disclosed herein may provide for specification of a previous (e.g., older) version of a set of machine readable instructions, and the option to back out (i.e., implement) the identified changes. The apparatus and method disclosed herein may provide for identification of those changes that may result in an undesirable behavior of a new version of a set of machine readable instructions so that the identified changes may be excluded or allowed to function in a new manner as specified by the new version of the set of machine readable instructions.

For the apparatus and method disclosed herein, the reverting of the changes to the set of machine readable instructions may occur at run time. In this regard, the need to install additional machine readable instructions may be bypassed. A user may execute an updated version of a set of machine readable instructions as per the intent of a developer of the set of machine readable instructions, while including incorrect (yet desirable to the specific user) behavior. Effectively, a user may execute an updated set of machine readable instructions using behavior identified as a defect even after the defect has been corrected.

For the apparatus and method disclosed herein, instead of installing multiple machine readable instructions patches, a user may install a single version (e.g., the updated version, or another intermediate version preferred by the user) of a set of machine readable instructions. The user may include or remove single fixes to the updated version of the set of machine readable instructions without having to install a machine readable instructions patch, and without having to lose any desirable operation of a previous version of the set of machine readable instructions upon installation of the updated version of the set of machine readable instructions.

FIG. 1 illustrates an architecture of a machine readable instructions backward compatibility apparatus (hereinafter also referred to as "apparatus 100"), according to an example of the present disclosure. Referring to FIG. 1, the apparatus 100 is depicted as including a backward compatibility switch determination module 102 to determine changes between first and second sets of machine readable instructions. For example, the first set of machine readable instructions may represent a previous set of machine readable instructions 104 (e.g., version 1.0), and the second set of machine readable instructions may represent an updated set of machine readable instructions 106 (e.g., version 3.0).

The backward compatibility switch determination module 102 may identify, from the determined changes, a change that causes a difference (e.g., a specified or noticeable) in an output of the second set of machine readable instructions compared to the first set of machine readable instructions. Further, the backward compatibility switch determination module 102 may generate a backward compatibility switch related to the change that causes the difference in the output of the second set of machine readable instructions. The backward compatibility switch may be included in a plurality of backward compatibility switches 108 generated by the backward compatibility switch determination module 102.

The backward compatibility switch may be implemented in the second set of machine readable instructions to selectively revert functionality related to the change that causes the difference in the output of the second set of machine readable instructions to functionality of the first set of machine readable instructions.

A master compatibility switch determination module 110 may generate a master compatibility switch 112 to enable or disable the backward compatibility switches 108.

Each of the backward compatibility switches 108 may be tracked by a switch tracking module 114 to determine whether a change in behavior of the second set of machine readable instructions will occur by turning on a respective backward compatibility switch. The switch tracking module 114 may log and report (e.g., to a user) any backward compatibility switch that causes a change.

The modules and other elements of the apparatus 100 may be machine readable instructions stored on a non-transitory computer readable medium. In this regard, the apparatus 100 may include or be a non-transitory computer readable medium. In addition, or alternatively, the modules and other elements of the apparatus 100 may be hardware or a combination of machine readable instructions and hardware.

For the apparatus 100, the backward compatibility switches 108 (i.e., command line arguments) generated by the backward compatibility switch determination module 102 may be used to change the behavior of the updated set of machine readable instructions 106. The updated set of machine readable instructions 106 may represent a latest (i.e., highest) version of the set of machine readable instructions, or may generally represent a different version (e.g., a higher, intermediate, or lower version) of the set of machine readable instructions that is to be implemented. For example, compared to a version of the set of machine readable instructions that is being used (e.g., version 5.0), a user may choose to implement a higher (e.g., version 7.0) or a lower (e.g., version 2.0) version of the corresponding set of machine readable instructions.

In order to determine the backward compatibility switches 108, during regression testing of the updated set of machine readable instructions 106 by the backward compatibility switch determination module 102, each time a failure occurs and the default behavior of a previous set of machine readable instructions 104 is changed, the backward compatibility switch determination module 102 may determine whether to include a backward compatibility option (e.g., via the backward compatibility switch) or to incorporate the new behavior (e.g., in cases of stability issues) without including the backward compatibility option. The regression testing may include a type of testing that seeks to uncover new faults, or regressions, in existing functional and non-functional areas of a set of machine readable instructions after changes such as enhancements, patches, or configuration changes, have been made to the set of machine readable instructions. If a backward compatibility option is needed, the backward compatibility switch determination module 102 may add the backward compatibility switch to the updated (or different) set of machine readable instructions 106. The backward compatibility switch may implement the previous behavior (i.e., functionality) of the updated set of machine readable instructions 106 when invoked. The backward compatibility switch may be implemented to be aware of the version (e.g., the latest version) it was added in, as well as the version (e.g., a previous version) where the default behavior changed.

The master compatibility switch 112 generated by the master compatibility switch determination module 110 may define the version that is being upgraded from (e.g., a previous version). The master compatibility switch 112 may be specified and set to a value of the version of the previous set of machine readable instructions 104. During execution of the updated set of machine readable instructions 106, applicable backward compatibility switches 108 may be enabled depending on the applicability of the version of the set of machine readable instructions. Further, each of the backward compatibility switches 108 may be tracked by the switch tracking module 114 to determine whether a change in behavior will occur by turning on a respective backward compatibility switch. The switch tracking module 114 may log and report (e.g., to a user) any backward compatibility switch that causes a change.

For example, a user may upgrade from version 2.0 of a set of machine readable instructions to version 4.0 of the set of machine readable instructions. In between versions 2.0 and version 4.0, ten backward compatibility switches (e.g., switches A-J) may be added. The master compatibility switch 112 may be used to turn on all of the switches A-J. During execution of the updated set of machine readable instructions 106 (e.g., version 4.0) the switch tracking module 114 may determine that out of the switches A-J, the switches A, D, and H caused a difference in the output of the previous set of machine readable instructions 104 (e.g., version 2.0). The switches A, D, and H may be reported, for example, to a user to further determine the cause of the differences. In this regard, as opposed to a case where thousands of such switches are to be evaluated, a user may analyze a limited number of switches (e.g., the switches A, D, and H) that are determined to cause a difference in the output of the previous set of machine readable instructions 104.

According to another example, a user may upgrade a set of machine readable instructions from version 1.0 to 4.0. Between version 1.0 and version 4.0, assuming that there were three new backward compatibility switches added (e.g., switch-1 "USE_OLD_FLOW_METHOD", switch-2 "USE_OLD_CHARTS", and switch-3 "USE_OLD_XML"), when version 4.0 is executed with the master compatibility switch 112, all of these switches (e.g., switch-1, switch-2, and switch-3) may be enabled. However, assuming that the user of version 4.0 is not using any charts or XML data in a particular document design, switch-2 and switch-3 will not result in a difference in the output of version 4.0. When version 4.0 is executed, the switch tracking module 114 may indicate that switch-1, switch-2, and switch-3 were enabled, but that switch-1 actually made a difference. Thus, a user of version 4.0 may investigate switch-1 (as opposed to switch-1, switch-2, and switch-3) and decide if the new, fixed method is acceptable, or if the user would like to continue to use switch-1 to implement the previous functionality of version 1.0.

After being informed of the change-causing switches, a user may remove the master compatibility switch 112, and implement certain ones of the backward compatibility switches 108 as needed.

Figure 2:
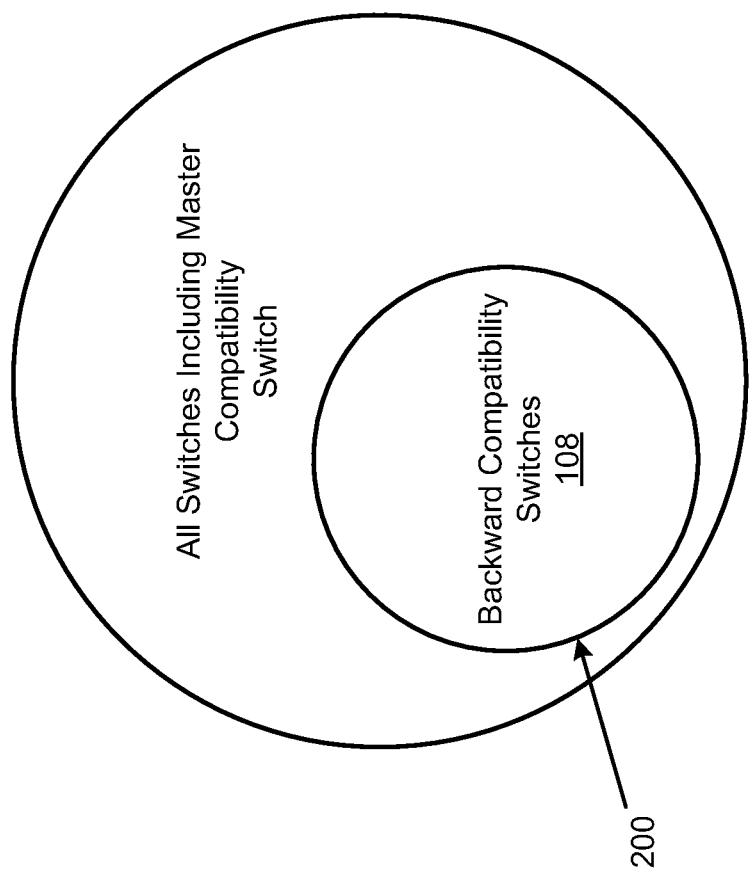
FIG. 2 illustrates backward compatibility switches and a master switch, according to an example of the present disclosure.

FIG. 2 illustrates backward compatibility switches 108 and a master compatibility switch 112, according to an example of the present disclosure. Referring to FIG. 2, for a given set of machine readable instructions, a set 200 of backward compatibility switches 108 may be stored for each version of the associated set of machine readable instructions. If a master compatibility switch 112 is enabled, every switch in the associated backward compatibility switch set may be enabled, while other backward compatibility switches may remain unaffected. However, according to an example, a user may still enable any switch outside the backward compatibility set for the associated set of machine readable instructions.

FIG. 3 illustrates an initial set of machine readable instructions 300, and an updated set of the machine readable instructions 302 including a backward compatibility switch, according to an example of the present disclosure. Referring to FIG. 3, the initial set of machine readable instructions 300 may represent, for example, a version 1.0 of a previous set of machine readable instructions 104. The updated machine readable instructions 302 may represent, for example, a version-3.0 of an updated set of machine readable instructions 106. For the updated set of machine readable instructions 302, a backward compatibility switch denoted "USE_OLD_FLOW_METHOD" may be added at 304. The updated set of machine readable instructions 302 may include paths from the initial set of machine readable instructions 300 and the updated set of machine readable instructions 302. The choice for each path may be determined by the presence of the "USE_OLD_FLOW_METHOD" switch. As a user may have come to rely on a previous method of determining when a new page is to be created (i.e., flow), the updated set of machine readable instructions 302 may provide the user with the option to rely on that behavior.

As described herein, the backward compatibility switches 108 may be implemented to be aware of the version (e.g., an updated version) they were added in, as well as the version (e.g., a previous version) where the default behavior changed. With respect to version awareness, the need for version awareness may be predicated on the basis that not all of the backward compatibility switches 108 are added at the same time as the fix they pertain to. With respect to the example of FIG. 3, the initial set of machine readable instructions are at version 1.0, where a defect was fixed in version 2.0, but a backward compatibility switch was not added until version 3.0, and the latest (i.e., updated) version may be set at version 4.0. Assuming a customer-A is currently using version 2.0, this means that customer-A is executing a fixed version and is not aware of any defects associated with version 2.0. Assuming that customer-A upgrades to version 4.0, upon upgrading, customer-A may now execute version 4.0 with the master compatibility switch, e.g., ENABLE_BACKWARD_COMPATIBILITY=2.0. Upon execution of version 4.0, version 4.0 may enable every backward compatibility switch between version 2.0 (the specified version) and version 4.0 (the currently executing version), with the example backward compatibility switch being added in version 3.0. However, upon turning on (i.e., enabling) the backward compatibility switch in the example of FIG. 3, customer-A may get unexpected changes to their page flow. In this regard, FIG. 4 illustrates various versions of machine readable instructions including implementation of a backward compatibility switch, according to an example of the present disclosure. Referring to FIG. 4, customer-A may want the same operation as before, whereas customer-B may have no choice since a backward compatibility switch did not exist in version 2.0. Further, customer-C may prefer the new operation for version 4.0, whereas customer-D may prefer operations to remain as before.

Figure 5:
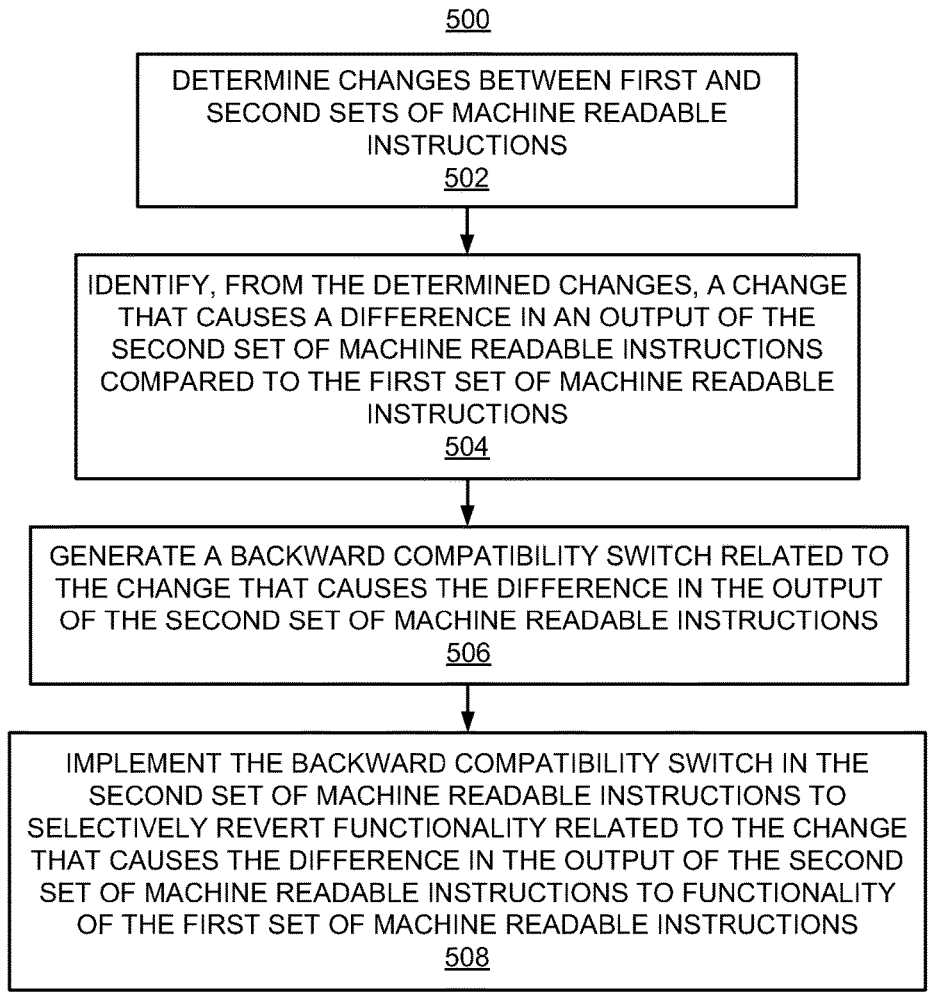
FIG. 5 illustrates a method for machine readable instructions backward compatibility, according to an example of the present disclosure.
Figure 6:
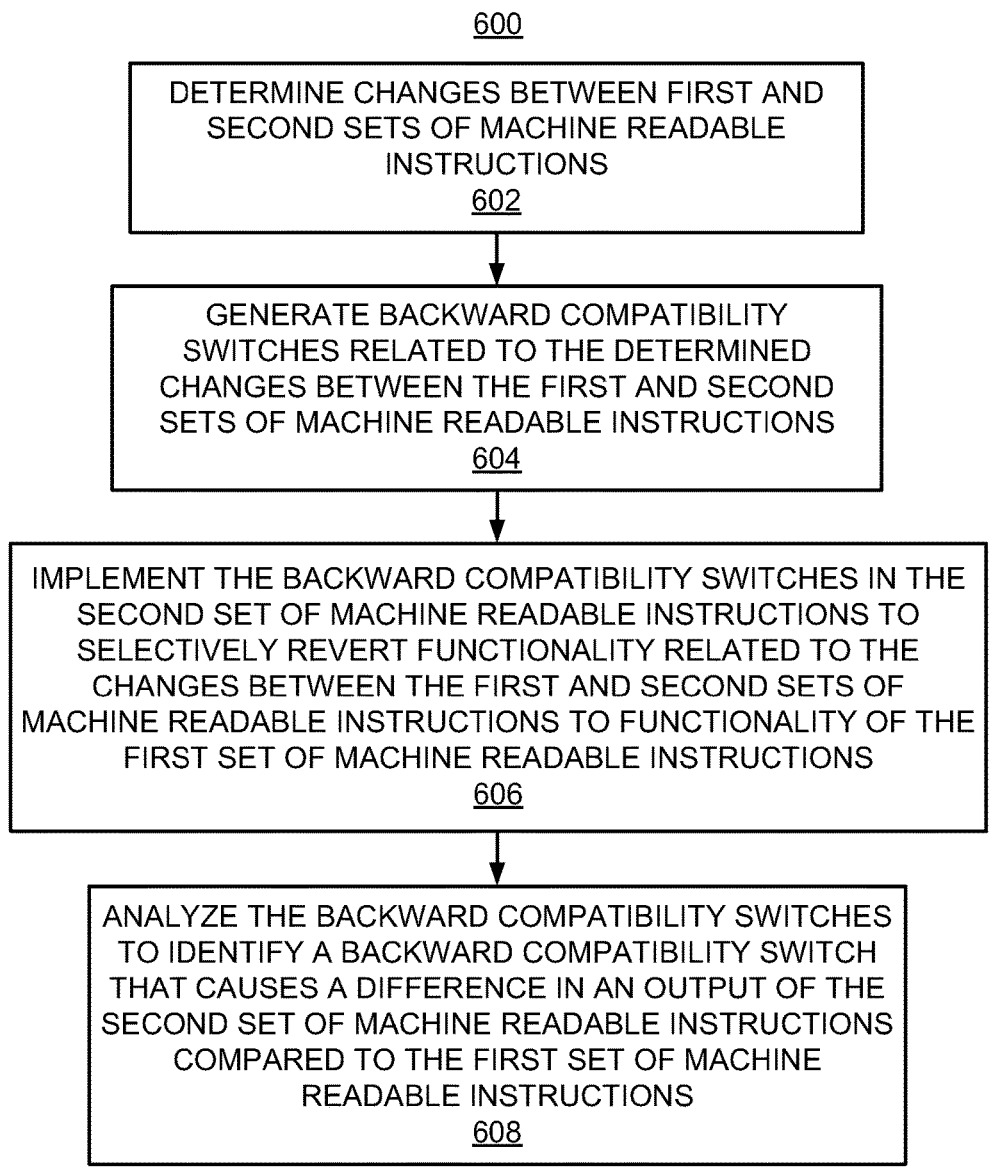
FIG. 6 illustrates further details of the method for machine readable instructions backward compatibility, according to an example of the present disclosure.
Figure 7:
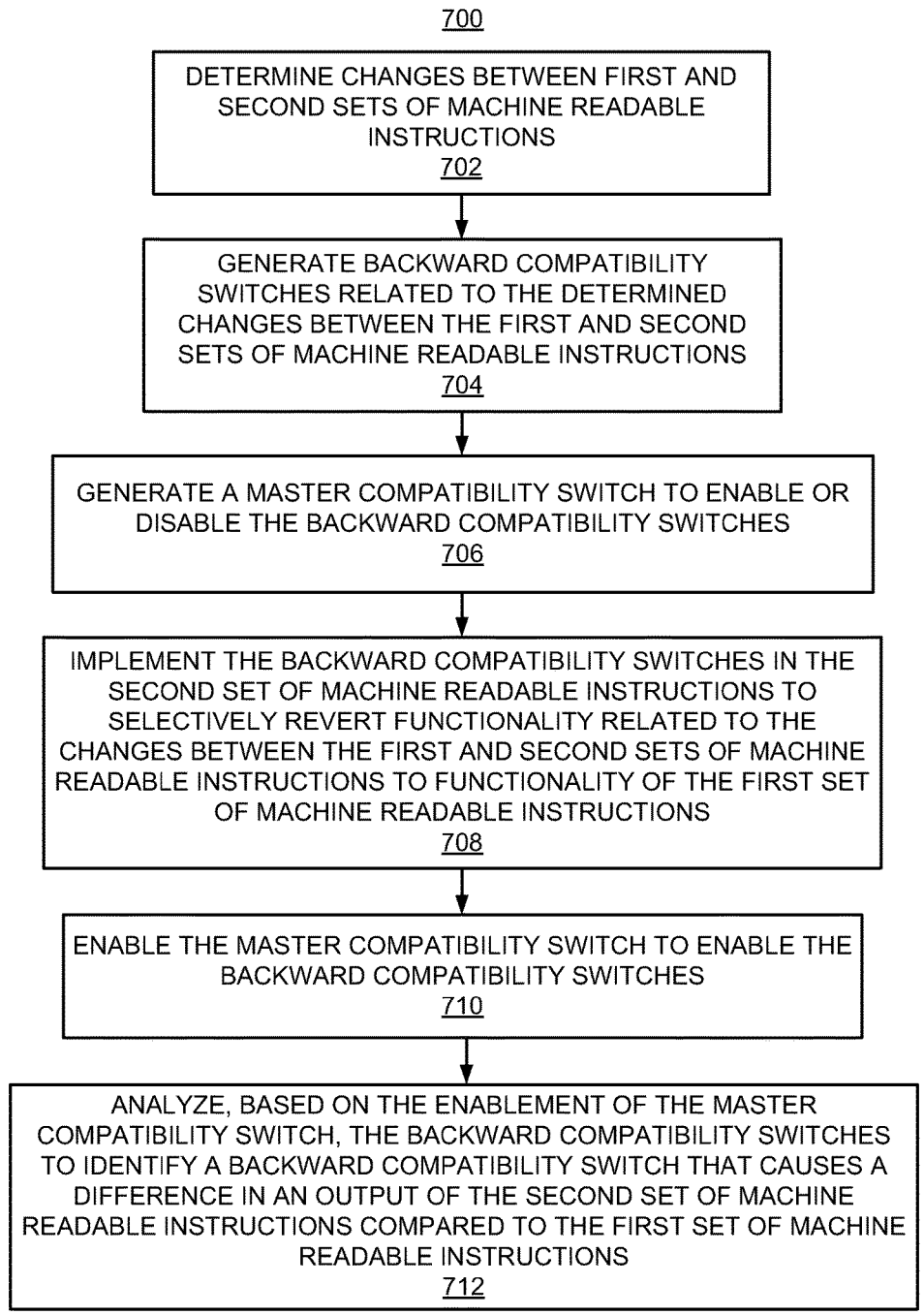
FIG. 7 illustrates further details of the method for machine readable instructions backward compatibility, according to an example of the present disclosure.

FIGS. 5-7 respectively illustrate flowcharts of methods 500, 600, and 700 for machine readable instructions backward compatibility, corresponding to the example of the machine readable instructions backward compatibility apparatus 100 whose construction is described in detail above. The methods 500, 600, and 700 may be implemented on the machine readable instructions backward compatibility apparatus 100 with reference to FIGS. 1-4 by way of example and not limitation. The methods 500, 600, and 700 may be practiced in other apparatus.

Referring to FIG. 5, for the method 500, at block 502, the method may include determining changes between first and second sets of machine readable instructions. For example, referring to FIG. 1, the backward compatibility switch determination module 102 may determine changes between previous and updated sets of machine readable instructions 104 and 106, respectively.

At block 504, the method may include identifying, from the determined changes, a change that causes a difference in an output of the second set of machine readable instructions compared to the first set of machine readable instructions. For example, referring to FIG. 1, the backward compatibility switch determination module 102 may identify, from the determined changes, a change that causes a difference (e.g., a specified or noticeable change) in an output of the updated set of machine readable instructions 106 compared to the previous set of machine readable instructions 104.

At block 506, the method may include generating a backward compatibility switch related to the change that causes the difference in the output of the second set of machine readable instructions. For example, referring to FIG. 1, the backward compatibility switch determination module 102 may generate a backward compatibility switch related to the change that causes the difference in the output of the updated set of machine readable instructions 106.

At block 508, the method may include implementing the backward compatibility switch in the second set of machine readable instructions to selectively revert functionality related to the change that causes the difference in the output of the second set of machine readable instructions to functionality of the first set of machine readable instructions. For example, referring to FIG. 1, the backward compatibility switch may be implemented in the updated set of machine readable instructions 106 to selectively revert functionality related to the change that causes the difference in the output of the updated set of machine readable instructions 106 to functionality of the previous set of machine readable instructions 104.

According to an example, for the method 500, a version of the second set of machine readable instructions (e.g., version 3.0) may be greater than a version of the first set of machine readable instructions (e.g., version 1.0). Alternatively, a version of the first set of machine readable instructions (e.g., version 3.0) may be greater than a version of the second set of machine readable instructions (e.g., version 1.0).

According to an example, the method 500 may further include performing regression testing on the second set of machine readable instructions to determine the changes between the first and second sets of machine readable instructions.

According to an example, the method 500 may further include determining versions of the first and second sets of machine readable instructions. Generating the backward compatibility switch related to the change that causes the difference in the output of the second set of machine readable instructions may further include generating the backward compatibility switch to include an identification of the versions of the first and/or second sets of machine readable instructions.

According to an example, the method 500 may further include generating a master compatibility switch to enable or disable a set of backward compatibility switches including the backward compatibility switch. For example, referring to FIG. 1, the master compatibility switch determination module 110 may generate a master compatibility switch 112 to enable or disable the backward compatibility switches 108.

According to an example, the changes between the first and second sets of machine readable instructions may include defect corrections between the first and second sets of machine readable instructions.

Referring to FIG. 6, for the method 600, at block 602, the method may include determining changes between first and second sets of machine readable instructions. For example, referring to FIG. 1, the backward compatibility switch determination module 102 may determine changes between previous and updated sets of machine readable instructions 104 and 106, respectively.

At block 604, the method may include generating backward compatibility switches related to the determined changes between the first and second sets of machine readable instructions. For example, referring to FIG. 1, the backward compatibility switch determination module 102 may generate the backward compatibility switches 108 related to the determined changes between the previous and updated sets of machine readable instructions 104 and 106, respectively.

At block 606, the method may include implementing the backward compatibility switches in the second set of machine readable instructions to selectively revert functionality related to the changes between the first and second sets of machine readable instructions to functionality of the first set of machine readable instructions. For example, referring to FIG. 1, the backward compatibility switches may be implemented in the updated set of machine readable instructions 106 to selectively revert functionality related to the changes between the previous and updated sets of machine readable instructions to functionality of the previous set of machine readable instructions 104.

At block 608, the method may include analyzing the backward compatibility switches to identify a backward compatibility switch that causes a difference in an output of the second set of machine readable instructions compared to the first set of machine readable instructions. For example, referring to FIG. 1, the backward compatibility switch determination module 102 may analyze the backward compatibility switches 108 to identify a backward compatibility switch that causes a difference in an output of the updated set of machine readable instructions 106 compared to the previous set of machine readable instructions 104.

According to an example, for the method 600, analyzing the backward compatibility switches to identify the backward compatibility switch that causes the difference in the output of the second set of machine readable instructions compared to the first set of machine readable instructions may further include generating a recommendation to implement the backward compatibility switch that causes the difference in the output of the second set of machine readable instructions compared to the first set of machine readable instructions. For example, referring to FIG. 1, analyzing the backward compatibility switches to identify the backward compatibility switch that causes the difference in the output of the second set of machine readable instructions compared to the first set of machine readable instructions may further include generating a recommendation (e.g., by the backward compatibility switch determination module 102) to implement the backward compatibility switch (e.g., one of the backward compatibility switches 108) that causes the difference in the output of the second set of machine readable instructions compared to the first set of machine readable instructions.

According to an example, the method 600 may further include performing regression testing on the second set of machine readable instructions to determine the changes between the first and second sets of machine readable instructions.

According to an example, the method 600 may further include determining versions of the first and second sets of machine readable instructions. Generating backward compatibility switches related to the determined changes between the first and second sets of machine readable instructions may further include generating the backward compatibility switches to include an identification of the versions of the first and/or second sets of machine readable instructions.

According to an example, the method 600 may further include generating a master compatibility switch to enable or disable the backward compatibility switches. For example, referring to FIG. 1, the master compatibility switch determination module 110 may generate a master compatibility switch 112 to enable or disable the backward compatibility switches 108.

Referring to FIG. 7, for the method 700, at block 702, the method may include determining changes between first and second sets of machine readable instructions. For example, referring to FIG. 1, the backward compatibility switch determination module 102 may determine changes between previous and updated sets of machine readable instructions 104 and 106, respectively.

At block 704, the method may include generating backward compatibility switches related to the determined changes between the first and second sets of machine readable instructions. For example, referring to FIG. 1, the backward compatibility switch determination module 102 may generate the backward compatibility switches 108 related to the determined changes between the previous and updated sets of machine readable instructions 104 and 106, respectively.

At block 706, the method may include generating a master compatibility switch to enable or disable the backward compatibility switches. For example, referring to FIG. 1, the master compatibility switch determination module 110 may generate a master compatibility switch 112 to enable or disable the backward compatibility switches 108.

At block 708, the method may include implementing the backward compatibility switches in the second set of machine readable instructions to selectively revert functionality related to the changes between the first and second sets of machine readable instructions to functionality of the first set of machine readable instructions. For example, referring to FIG. 1, the backward compatibility switches may be implemented in the updated set of machine readable instructions 106 to selectively revert functionality related to the changes between the previous and updated sets of machine readable instructions to functionality of the previous set of machine readable instructions 104.

At block 710, the method may include enabling the master compatibility switch to enable the backward compatibility switches. For example, referring to FIG. 1, the master compatibility switch determination module 110 may enable the master compatibility switch 112 to enable the backward compatibility switches 108.

At block 712, the method may include analyzing, based on the enablement of the master compatibility switch, the backward compatibility switches to identify a backward compatibility switch that causes a difference in an output of the second set of machine readable instructions compared to the first set of machine readable instructions. For example, referring to FIG. 1, the backward compatibility switch determination module 102 may analyze, based on the enablement of the master compatibility switch, the backward compatibility switches 108 to identify a backward compatibility switch that causes a difference in an output of the updated set of machine readable instructions 106 compared to the previous set of machine readable instructions 104.

According to an example, the method 700 may further include determining versions of the first and second sets of machine readable instructions. Generating backward compatibility switches related to the determined changes between the first and second sets of machine readable instructions may further include generating the backward compatibility switches to include an identification of the versions of the first and/or second sets of machine readable instructions.

According to an example, for the method 700, analyzing, based on the enablement of the master compatibility switch, the backward compatibility switches to identify the backward compatibility switch that causes the difference in the output of the second set of machine readable instructions compared to the first set of machine readable instructions may further include generating a recommendation to implement the backward compatibility switch that causes the difference in the output of the second set of machine readable instructions compared to the first set of machine readable instructions.

Figure 8:
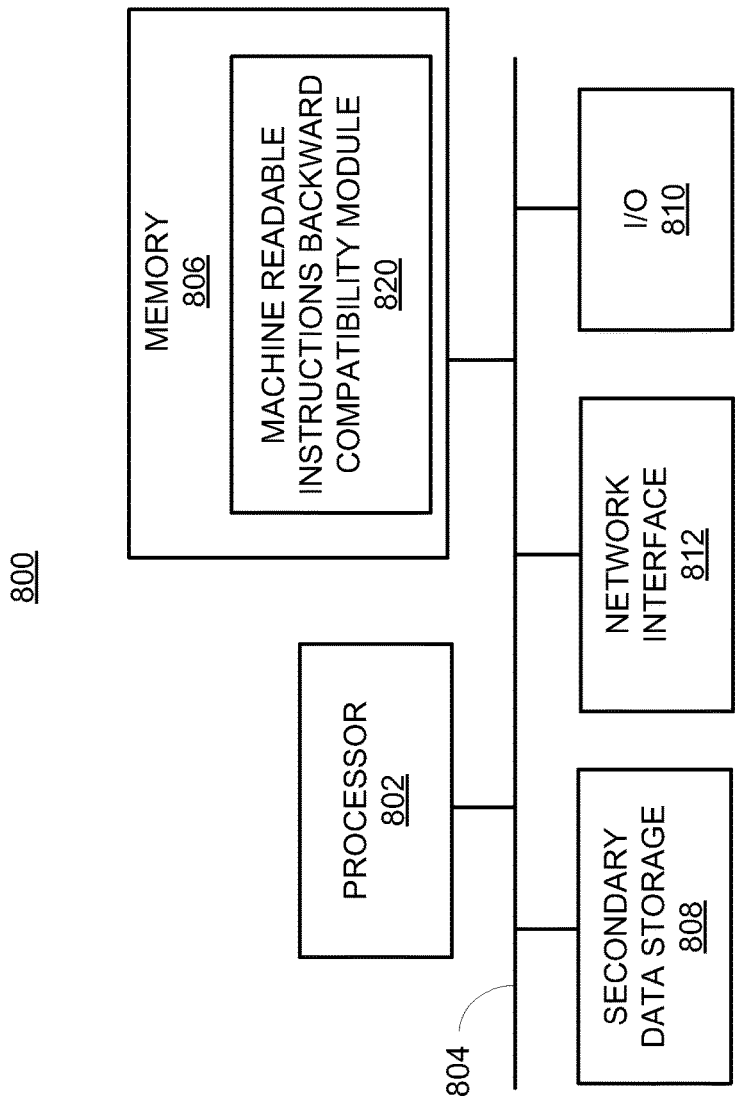
FIG. 8 illustrates a computer system, according to an example of the present disclosure.

FIG. 8 shows a computer system 800 that may be used with the examples described herein. The computer system 800 may represent a generic platform that includes components that may be in a server or another computer system. The computer system 800 may be used as a platform for the apparatus 100. The computer system 800 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 800 may include a processor 802 that may implement or execute machine readable instructions performing some or all of the methods, functions and other processes described herein. Commands and data from the processor 802 may be communicated over a communication bus 804. The computer system may also include a main memory 806, such as a random access memory (RAM), where the machine readable instructions and data for the processor 802 may reside during runtime, and a secondary data storage 808, which may be non-volatile and stores machine readable instructions and data. The memory and data storage are examples of computer readable mediums. The memory 806 may include a machine readable instructions backward compatibility module 820 including machine readable instructions residing in the memory 806 during runtime and executed by the processor 802. The machine readable instructions backward compatibility module 820 may include the modules of the apparatus 100 shown in FIG. 1.

The computer system 800 may include an I/O device 810, such as a keyboard, a mouse, a display, etc. The computer system may include a network interface 812 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A method for machine readable instructions backward compatibility, the method comprising:
   determining changes between first and second sets of machine readable instructions;
   identifying, from the determined changes, a change that causes a difference in an output of the second set of machine readable instructions compared to the first set of machine readable instructions;

generating, by a processor, a backward compatibility switch related to the change that causes the difference in the output of the second set of machine readable instructions; and implementing the backward compatibility switch in the second set of machine readable instructions to selectively revert functionality related to the change that causes the difference in the output of the second set of machine readable instructions to functionality of the first set of machine readable instructions.

2. The method of claim 1, wherein a version of the second set of machine readable instructions is greater than a version of the first set of machine readable instructions.

3. The method of claim 1, wherein a version of the first set of machine readable instructions is greater than a version of the second set of machine readable instructions.

4. The method of claim 1, further comprising:
performing regression testing on the second set of machine readable instructions to determine the changes between the first and second sets of machine readable instructions.

5. The method of claim 1, further comprising:
determining versions of the first and second sets of machine readable instructions, wherein generating the backward compatibility switch related to the change that causes the difference in the output of the second set of machine readable instructions further comprises:
generating the backward compatibility switch to include an identification of at least one of the versions of the first and second sets of machine readable instructions.

6. The method of claim 1, further comprising:
generating a master compatibility switch to enable or disable a set of backward compatibility switches including the backward compatibility switch.

7. The method of claim 1, wherein the changes between the first and second sets of machine readable instructions include defect corrections between the first and second sets of machine readable instructions.

8. A machine readable instructions backward compatibility apparatus comprising:
a processor; and
a memory storing machine readable instructions that when executed by the processor cause the processor to:
determine changes between first and second sets of machine readable instructions;
generate backward compatibility switches related to the determined changes between the first and second sets of machine readable instructions;
implement the backward compatibility switches in the second set of machine readable instructions to selectively revert functionality related to the changes between the first and second sets of machine readable instructions to functionality of the first set of machine readable instructions; and
analyze the backward compatibility switches to identify a backward compatibility switch that causes a difference in an output of the second set of machine readable instructions compared to the first set of machine readable instructions.

9. The machine readable instructions backward compatibility apparatus according to claim 8, wherein the machine readable instructions to analyze the backward compatibility switches to identify the backward compatibility switch that causes the difference in the output of the second set of machine readable instructions compared to the first set of machine readable instructions further comprise instructions to:
generate a recommendation to implement the backward compatibility switch that causes the difference in the output of the second set of machine readable instructions compared to the first set of machine readable instructions.

10. The machine readable instructions backward compatibility apparatus according to claim 8, further comprising machine readable instructions to:
perform regression testing on the second set of machine readable instructions to determine the changes between the first and second sets of machine readable instructions.

11. The machine readable instructions backward compatibility apparatus according to claim 8, further comprising machine readable instructions to:
determine versions of the first and second sets of machine readable instructions, wherein generating backward compatibility switches related to the determined changes between the first and second sets of machine readable instructions further comprises instructions to:
generate the backward compatibility switches to include an identification of at least one of the versions of the first and second sets of machine readable instructions.

12. The machine readable instructions backward compatibility apparatus according to claim 8, further comprising machine readable instructions to:
generate a master compatibility switch to enable or disable the backward compatibility switches.

13. A non-transitory computer readable medium having stored thereon machine readable instructions to provide machine readable instructions backward compatibility, the machine readable instructions, when executed, cause a processor to:
determine changes between first and second sets of machine readable instructions;
generate backward compatibility switches related to the determined changes between the first and second sets of machine readable instructions;
generate a master compatibility switch to enable or disable the backward compatibility switches;
implement the backward compatibility switches in the second set of machine readable instructions to selectively revert functionality related to the changes between the first and second sets of machine readable instructions to functionality of the first set of machine readable instructions;
enable the master compatibility switch to enable the backward compatibility switches; and
analyze, based on the enablement of the master compatibility switch, the backward compatibility switches to identify a backward compatibility switch that causes a difference in an output of the second set of machine readable instructions compared to the first set of machine readable instructions.

14. The non-transitory computer readable medium according to claim 13, further comprising machine readable instructions to:
determine versions of the first and second sets of machine readable instructions, wherein generating backward compatibility switches related to the determined changes between the first and second sets of machine readable instructions further comprises instructions to:

generate the backward compatibility switches to include an identification of at least one of the versions of the first and second sets of machine readable instructions.

15. The non-transitory computer readable medium according to claim 13, wherein the machine readable instructions to analyze, based on the enablement of the master compatibility switch, the backward compatibility switches to identify the backward compatibility switch that causes the difference in the output of the second set of machine readable instructions compared to the first set of machine readable instructions further comprise instructions to:

generate a recommendation to implement the backward compatibility switch that causes the difference in the output of the second set of machine readable instructions compared to the first set of machine readable instructions.

\* \* \* \* \*